United States Patent
Sasaki et al.

(10) Patent No.: US 10,498,037 B1
(45) Date of Patent: Dec. 3, 2019

(54) ANTENNA CIRCUIT

(71) Applicant: Nippon Telegraph and Telephone Corporation, Tokyo (JP)

(72) Inventors: Ai-ichiro Sasaki, Atsugi (JP); Junichi Kodate, Atsugi (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 16/301,897

(22) PCT Filed: Jun. 5, 2018

(86) PCT No.: PCT/JP2018/021558
§ 371 (c)(1),
(2) Date: Nov. 15, 2018

(87) PCT Pub. No.: WO2018/235592
PCT Pub. Date: Dec. 27, 2018

(30) Foreign Application Priority Data

Jun. 19, 2017 (JP) .................................. 2017-119519

(51) Int. Cl.
*H01Q 7/00* (2006.01)
*H01Q 1/50* (2006.01)

(52) U.S. Cl.
CPC ............... *H01Q 7/005* (2013.01); *H01Q 1/50* (2013.01)

(58) Field of Classification Search
CPC ............ H01Q 7/00; H01Q 7/005; H01Q 1/50; H01Q 21/08; H01Q 21/24; H01Q 3/26
See application file for complete search history.

(56) References Cited

U.S. PATENT DOCUMENTS

| 5,764,196 A | * | 6/1998 | Fujimoto | ............... | H01Q 7/005 343/867 |
| 6,960,984 B1 | * | 11/2005 | Vicci | .................... | G06K 7/0008 340/10.1 |

(Continued)

FOREIGN PATENT DOCUMENTS

| EP | 0579332 A1 | 1/1994 |
| EP | 1041503 A1 | 10/2000 |

(Continued)

OTHER PUBLICATIONS

International Search Report, PCT Application No. PCT/JP2018/021558, dated Jul. 3, 2018.

(Continued)

*Primary Examiner* — Dameon E Levi
*Assistant Examiner* — Jennifer F Hu
(74) *Attorney, Agent, or Firm* — Kilpatrick Townsend & Stockton LLP

(57) ABSTRACT

In an antenna circuit including an antenna 1 and an antenna 2 that is connected in series with the antenna 1 and includes inductance, a variable capacitor $C_v$ and a variable resistor $R_v$ connected in parallel with the antenna 2 are provided. This enables controlling of an actual amplitude ratio r and a phase difference θ between currents $I_1$ and $I_2$ flowing through the two antennas 1 and 2 into desired values. Flows of the currents $I_1$ and $I_2$ with the phase difference θ through the antennas 1 and 2 enable forming of a favorable communication area. In addition, setting of the actual amplitude ratio r between the currents $I_1$ and $I_2$ flowing through the antennas 1 and 2 to a value other than 1 enables forming of an asymmetric communication area.

7 Claims, 6 Drawing Sheets

(56) References Cited

U.S. PATENT DOCUMENTS

| | | | |
|---|---|---|---|
| 10,177,823 B2* | 1/2019 | Sasaki | H04B 7/04 |
| 10,340,598 B2* | 7/2019 | Sasaki | |
| 2007/0099589 A1* | 5/2007 | Kawai | H04B 1/18 |
| | | | 455/269 |
| 2010/0309068 A1 | 12/2010 | Duron et al. | |
| 2013/0281016 A1* | 10/2013 | McFarthing | H04B 5/00 |
| | | | 455/41.1 |
| 2015/0097741 A1 | 4/2015 | Pachier et al. | |
| 2018/0287257 A1* | 10/2018 | Sasaki | H01Q 7/04 |

FOREIGN PATENT DOCUMENTS

| | | |
|---|---|---|
| JP | 8-293724 A | 11/1996 |
| JP | 2009-71413 A | 4/2009 |
| JP | 6059833 B1 | 1/2017 |
| JP | 6069548 B1 | 2/2017 |
| WO | 2016/147934 A1 | 9/2016 |

OTHER PUBLICATIONS

Office Action, Japanese Patent Application No. 2017-119510, dated Oct. 10, 2017.
Written Opinion, PCT Application No. PCT/JP2018/021558, dated Jul. 3, 2018.
Response to Office Action, Japanese Patent Application No. 2017-119510, dated Nov. 28, 2017.
Decision to Grant, Japanese Patent Application No. 2017-119510, dated Dec. 12, 2017.
Office Action, Chinese Patent Application No. 201880002019.6, dated May 8, 2019, 12 pages.

* cited by examiner

ANTENNA CIRCUIT

TECHNICAL FIELD

The present invention relates to a wireless communication technology that enables desired setting of a boundary of a communication area.

BACKGROUND ART

The needs of a wireless communication system that limits a communication area as desired have been increased recently. A system using a magnetic field has been in practical use as such a wireless communication system. A loop antenna and a bar antenna have been used for generating the magnetic field. A disclosed effective way in generating a magnetic field desired by a designer is to use multiple antennas and appropriately control phases of currents flowing through those antennas (Patent document 1).

PRIOR ART DOCUMENT

Patent Document

Patent document 1: Japanese Patent No. 6059833
Patent document 2: Japanese Patent No. 6069548

SUMMARY OF THE INVENTION

Problem to be Solved by the Invention

In general, the technology using multiple antennas usually employs a configuration in which the multiple antennas are connected in series (Patent document 2). Such a series connection configuration requires only one signal source, which is an advantage. However, in the simple series connection configuration disclosed in Patent document 2, amplitude and phases of currents flowing through the antennas naturally take the same values in all the antennas.

Thus, there is a problem that multiple signal sources are needed in order to control the amplitude and phases of the currents flowing through the antennas according to the proposition of Patent document 1.

The present invention is made in light of the above-described problem, and has an object to control the amplitude and phases of the currents flowing through the multiple antennas connected in series into desired values.

Means for Solving the Problem

An antenna circuit according to an aspect of the present invention includes: a first antenna; a second antenna that is connected in series with the first antenna and includes inductance; an adjustment capacitor that is connected in parallel with the second antenna; and an adjustment resistor that is connected in parallel with the second antenna.

Effect of the Invention

According to the present invention, it is possible to control amplitude and phases of currents flowing through multiple antennas connected in series into desired values.

MODE FOR CARRYING OUT THE INVENTION

An embodiment of the present invention is described below with reference to the drawings.

Figure 1:
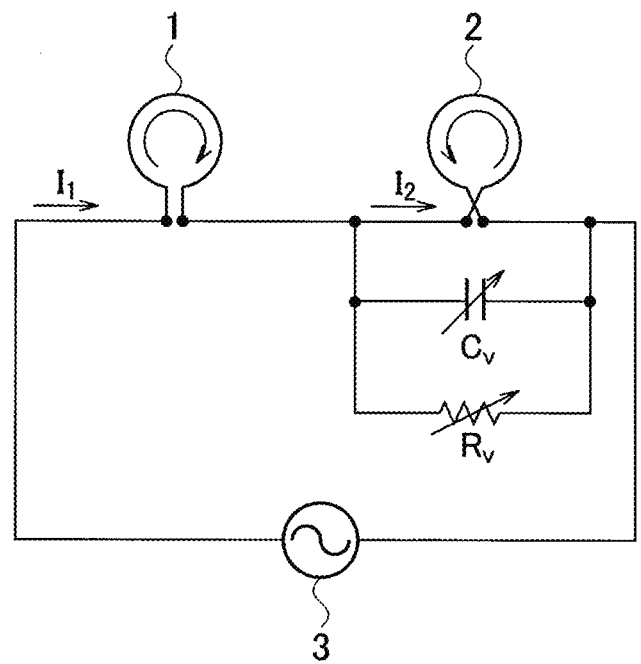
FIG. 1 is a diagram that illustrates a configuration example of an antenna circuit of an embodiment.

FIG. 1 is a diagram that illustrates a configuration example of an antenna circuit of this embodiment.

The antenna circuit illustrated in FIG. 1 includes multiple antennas 1 and 2 connected in series, a signal source 3, and a variable capacitor $C_v$ and a variable resistor $R_v$ connected in parallel with the antenna 2.

In the antenna circuit illustrated in FIG. 1, the antennas 1 and 2 are connected such that currents therethrough flow in different directions from each other. However, the antennas 1 and 2 may be connected such that the currents therethrough flow in the same direction. Complex amplitude of a current $I_2$ flowing through the antenna 2 varies according to a capacitance value of the variable capacitor $C_v$ and a resistance value of the variable resistor $R_v$ and differs from complex amplitude of a current $I_1$ flowing through the antenna 1. Appropriate setting of the capacitance value of the variable capacitor $C_v$ and the resistance value of the variable resistor $R_v$ enables controlling of an actual amplitude ratio ($r=|I_1/I_2|$) and a phase difference ($\theta=\arg(I_1/I_2)$) between the currents flowing through the two antennas 1 and 2 into desired values. Unless otherwise stated, the symbols $I_1$ and $I_2$ denoting the currents represent the complex amplitude.

Figure 2:
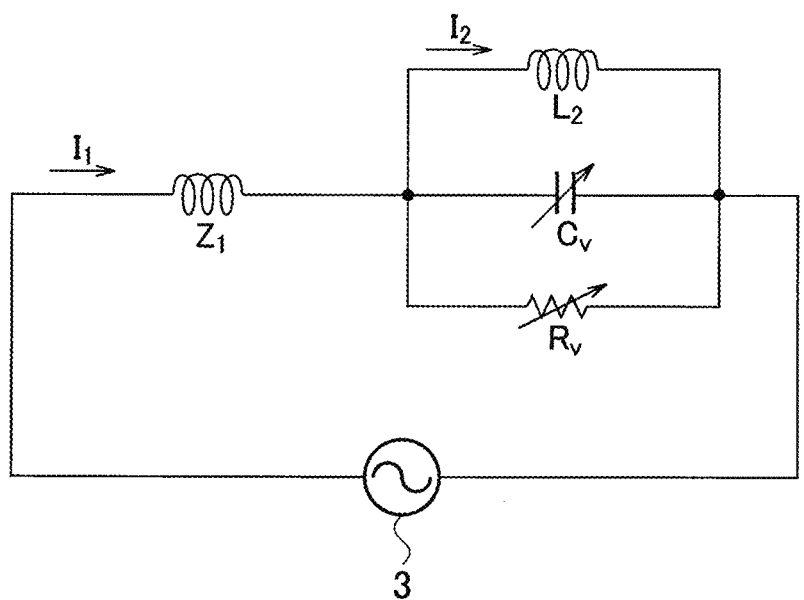
FIG. 2 is a diagram that illustrates an equivalent circuit of the antenna circuit in FIG. 1.

FIG. 2 illustrates an equivalent circuit of the antenna circuit in FIG. 1. $Z_1$ represents impedance of the antenna 1. $L_2$ represents inductance of the antenna 2.

The actual amplitude ratio r and the phase difference θ between the currents are indicated by the following equations (1) and (2).

[Math. 1]

$$r = |1 - \omega^2 L_2 C_v| \cdot \sqrt{1 + \left(\frac{\omega L_2 / R_v}{1 - \omega^2 L_2 C_v}\right)^2} \quad (1)$$

[Math. 2]

$$\theta = \arctan\left(\frac{\omega L_2 / R_v}{1 - \omega^2 L_2 C_v}\right) \quad (2)$$

In the equations, ω is an angular frequency of a signal generated by the signal source 3.

Both the equations (1) and (2) are independent of the impedance $Z_1$ of the antenna 1. Thus, an arbitrary antenna can be used as the antenna 1. The antenna 2 may be at least an antenna having inductance such as a loop antenna and a bar antenna. In the example of FIG. 1, the antennas 1 and 2 have the same shape; however, they may have different shapes.

Now, a value $C_v^{opt}$ of the variable capacitor $C_v$ and a value $R_v^{opt}$ of the variable resistor $R_v$ required to achieve desired actual amplitude ratio $r_0$ and phase difference $\theta_0$ between the currents are described.

The actual amplitude ratio $r_0$ and phase difference $\theta_0$ are substituted into the equations (1) and (2) to solve for $C_v^{opt}$ and $R_v^{opt}$, and thus the following equations (3) and (4) can be obtained.

[Math. 3]

$$C_v^{opt} = \frac{1 - r_0 \cos\theta_0}{\omega^2 L_2} \quad (3)$$

[Math. 4]

$$R_v^{opt} = \frac{\omega L_2}{r_0 \sin\theta_0} \quad (4)$$

The desired actual amplitude ratio $r_0$ and phase difference $\theta_0$ can be achieved by setting the value of the variable capacitor $C_v$ of the antenna circuit in FIG. 1 to a value obtained from the equation (3) and setting the value of the variable resistor $R_v$ of the antenna circuit in FIG. 1 to a value obtained from the equation (4).

For example, it is assumed that the desired actual amplitude ratio $r_0$ and phase difference $\theta_0$ are values of the following equation (5).

[Math. 5]

$$r_0=1, \theta_0=11 \text{ deg} \quad (5)$$

In addition, it is assumed that a signal frequency f of the signal source 3 and the inductance $L_2$ of the antenna 2 are values of the following equation (6).

[Math. 6]

$$f=1 \text{ MHz}, L_2=10 \text{ μH} \quad (6)$$

The equations (5) and (6) are substituted into the equations (3) and (4) to calculate appropriate parameters, and thus the following values $C_v^{opt}$ and $R_v^{opt}$ can be obtained.

[Math. 7]

$$C_v^{opt}T46.5389 \text{ pF}, R_v^{opt}=329.292\Omega \quad (7)$$

Figure 3:
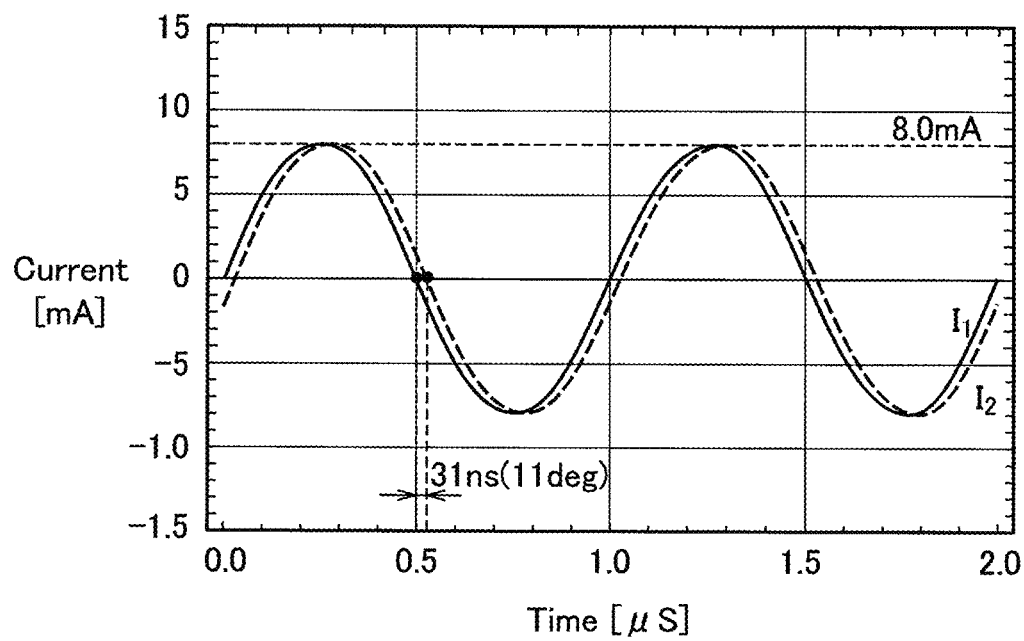
FIG. 3 is a diagram that illustrates current waveforms in a simulation on the equivalent circuit in FIG. 2.

FIG. 3 illustrates waveforms of the currents $I_1$ and $I_2$ in a simulation on the equivalent circuit in FIG. 2 using the parameters of the equations (6) and (7). An amplitude of voltage applied from the signal source 3 is 1V.

According to FIG. 3, it can be seen that the amplitude ratio between the currents $I_1$ and $I_2$ is 1 and a time difference therebetween is 31 ns (comparable to 11 deg). In the antenna circuit of this embodiment, employment of the values $C_v^{opt}$ and $R_v^{opt}$ calculated from the equations (3) and (4) enables controlling of the amplitude ratio and phase difference between the currents $I_1$ and $I_2$ flowing through the antennas 1 and 2 as desired.

Now, effects of the current phase difference on magnetic field distribution are described.

Figure 4:
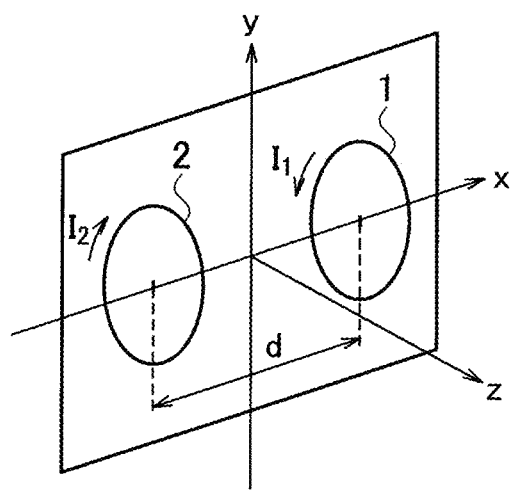
FIG. 4 is a diagram that illustrates an arrangement example of antennas.

As illustrated in FIG. 4, it is assumed that the antennas 1 and 2 having the same shape are disposed in an x-y plane. It is assumed that directions of the currents $I_1$ and $I_2$ flowing through the antennas 1 and 2 are different from each other.

Figure 5:
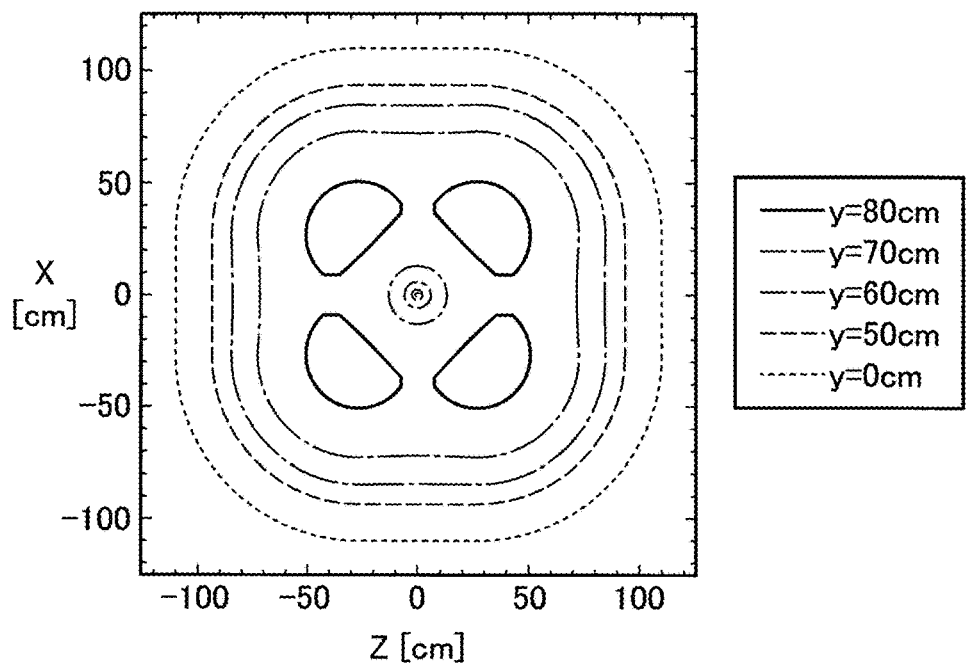
FIG. 5 is a diagram that illustrates magnetic field distribution obtained when currents with an amplitude ratio of 1 and no phase difference are applied to the antennas in FIG. 4.
Figure 6:
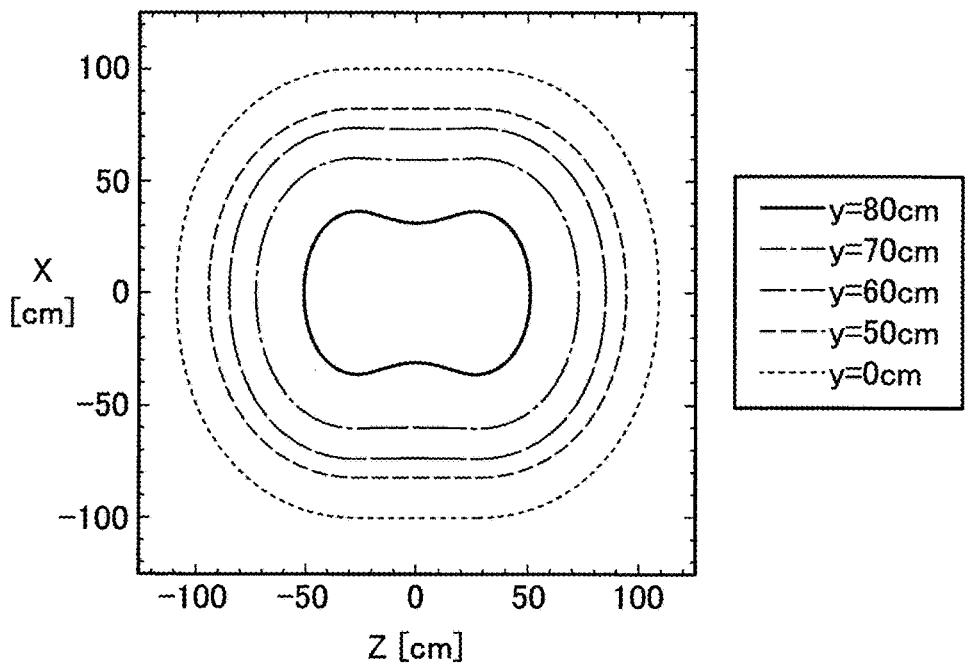
FIG. 6 is a diagram that illustrates magnetic field distribution obtained when the currents illustrated in FIG. 3 are applied to the antennas in FIG. 4.

FIG. 5 is a diagram that illustrates magnetic field distribution obtained when currents with the amplitude ratio of 1 and no phase difference are applied to the antennas 1 and 2 illustrated in FIG. 4. FIG. 6 is a diagram that illustrates magnetic field distribution obtained when the currents $I_1$ and $I_2$ illustrated in FIG. 3 are applied to the antennas 1 and 2 illustrated in FIG. 4. Each contour in FIGS. 5 and 6 indicate a line plotting points where a magnetic field strength has a certain value at a y-coordinate of 0, 50, 60, 70, or 80 cm.

In FIG. 5, the contour is divided when a value of the y-coordinate is large, and this is a problem in forming a communication area. On the other hand, in FIG. 6, the contour is not divided even when the value of the y-coordinate is large, and this enables forming of a favorable communication area.

Next, an example of forming asymmetric magnetic field distribution is described.

As illustrated in FIG. 5, the magnetic field distribution obtained by the conventional antenna circuit configuration is symmetric about a y-z plane. In addition, as illustrated in FIG. 6, changing of only phases of the currents $I_1$ and $I_2$ flowing through the antennas 1 and 2 still makes the magnetic field distribution symmetric about the y-z plane. However, asymmetric magnetic field distribution may be desired in some application.

In the antenna circuit of this embodiment, setting of both the amplitude and the phases of the currents $I_1$ and $I_2$ flowing through the antennas 1 and 2 to different values enables creating of magnetic field distribution asymmetric about the y-z plane.

For example, it is assumed that the currents $I_1$ and $I_2$ satisfying the following equation (8) flow through the antennas 1 and 2. Note that, it is assumed that the signal frequency f of the signal source 3 and the inductance $L_2$ of the antenna 2 are the values of the equation (6).

[Math. 8]

$$r_0=1/1.3, \theta_0=10 \text{ deg} \quad (8)$$

The equations (6) and (8) are substituted into the equations (3) and (4) to calculate appropriate parameters, and thus the following values $C_v^{opt}$ and $R_v^{opt}$ can be obtained.

[Math. 9]

$$C_v^{opt}T614.147 \text{ pF}, R_v^{opt}=470.384\Omega \quad (9)$$

Figure 7:
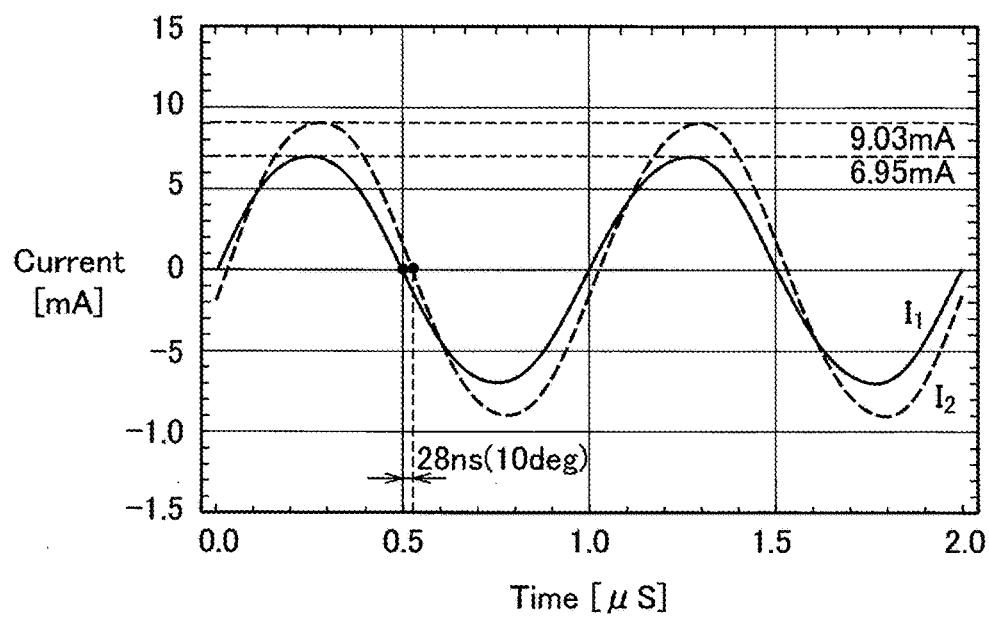
FIG. 7 is a diagram that illustrates other current waveforms in a simulation on the equivalent circuit in FIG. 2.

FIG. 7 illustrates waveforms of the currents $I_1$ and $I_2$ in a simulation on the equivalent circuit in FIG. 2 using the parameters of the equations (6) and (9). An amplitude of voltage applied from the signal source 3 is 1V.

According to FIG. 7, it can be seen that the amplitude ratio of the currents $I_1$ and $I_2$ is 1/1.3 and a time difference therebetween is 28 ns (comparable to 10 deg).

Figure 8:
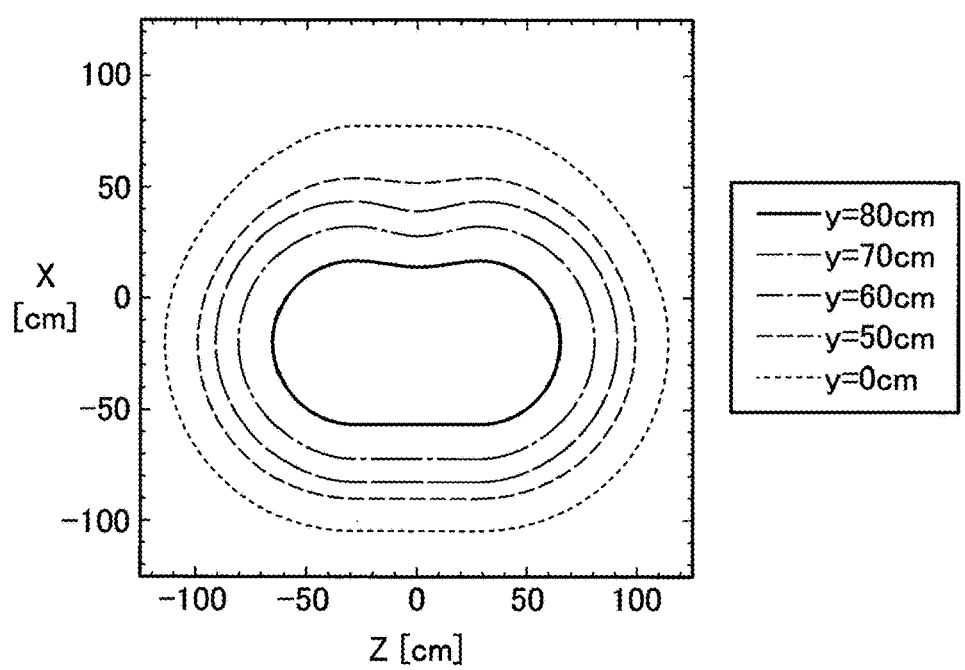
FIG. 8 is a diagram that illustrates magnetic field distribution obtained when the currents illustrated in FIG. 7 are applied to the antennas in FIG. 4.

FIG. 8 is a diagram that illustrates magnetic field distribution obtained when the currents $I_1$ and $I_2$ illustrated in FIG. 7 are applied to the antennas 1 and 2 illustrated in FIG. 4. As illustrated in FIG. 8, it can be seen that magnetic field distribution asymmetric about the y-z plane is formed.

Next, another antenna circuit of this embodiment is described.

Figure 9:
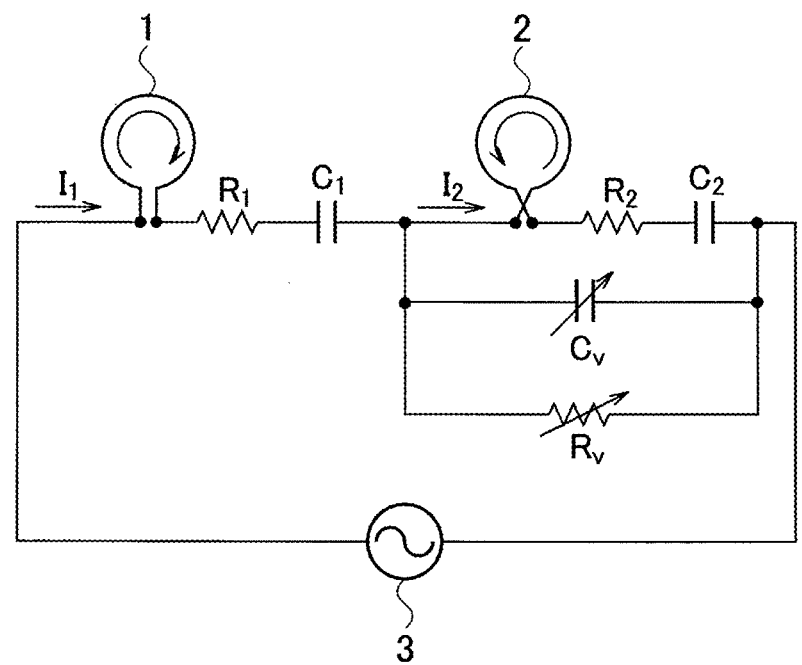
FIG. 9 is a diagram that illustrates a configuration example of another antenna circuit of the embodiment.

FIG. 9 is a diagram that illustrates a configuration example of the other antenna circuit of this embodiment.

The antenna circuit illustrated in FIG. 9 is different from the antenna circuit in FIG. 1 in that a resistor $R_1$ and a capacitor $C_1$ as well as a resistor $R_2$ and a capacitor $C_2$ are connected in series with the antenna 1 and the antenna 2 respectively. The variable capacitor $C_v$ and the variable resistor $R_v$ are connected in parallel with the components including the antenna 2, the resistor $R_2$, and the capacitor $C_2$.

When a loop antenna is used as each of the antennas 1 and 2, a capacitor is connected in series with the antenna in order to reduce the impedance due to the inductance of the loop antenna. In some cases, a resistor is intentionally connected in order to decrease a quality factor of the antenna.

Figure 10:
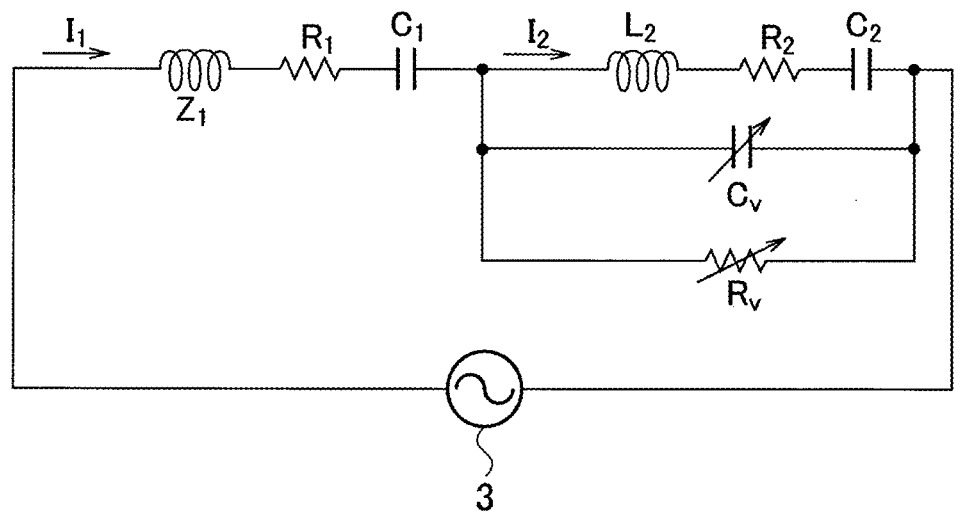
FIG. 10 is a diagram that illustrates an equivalent circuit of the antenna circuit in FIG. 9.

FIG. 10 illustrates an equivalent circuit of the antenna circuit in FIG. 9. For the equivalent circuit in FIG. 10, the capacitance value $C_v^{opt}$ of the variable capacitor $C_v$ and the resistance value $R_v^{opt}$ of the variable resistor $R_v$ for achieving the desired actual amplitude ratio $r_0$ and phase difference $\theta_0$ between the currents can be obtained from the following equations (10) and (11).

[Math. 10]

$$C_v^{opt} = C_2 \cdot \frac{\omega C_2 R_2 r_0 \sin\theta_0 + (\omega^2 L_2 C_2 - 1)(1 - r_0 \cos\theta_0)}{1 + (\omega C_2 R_2)^2 + \omega^2 L_2 C_2 (\omega^2 L_2 C_2 - 2)} \quad (10)$$

[Math. 11]

$$R_v^{opt} = \frac{1}{\omega C_2} \cdot \frac{1 + (\omega C_2 R_2)^2 + \omega^2 L_2 C_2 (\omega^2 L_2 C_2 - 2)}{\omega C_2 R_2 (r_0 \cos\theta_0 - 1) + r_0 \sin\theta_0 (\omega^2 L_2 C_2 - 1)} \quad (11)$$

For example, it is assumed that the desired actual amplitude ratio $r_0$ and phase difference $\theta_0$ are values of the following equation (12).

[Math. 12]

$$r_0 = 1, \theta_0 = 11 \text{ deg} \quad (12)$$

In addition, it is assumed that the signal frequency f of the signal source 3 and the inductance $L_2$, the capacitors $C_1$ and $C_2$, and the resistors $R_1$ and $R_2$ of the antenna 2 have values of the following equation (13).

[Math. 13]

$$f = 1 \text{ MHz}, L_1 = L_2 = 10 \text{ }\mu\text{H}, C_1 = C_2 = 2800 \text{ pF},$$
$$R_1 = R_2 = 10\Omega \quad (13)$$

The equations (12) and (13) are substituted into the equations (10) and (11) to calculate appropriate parameters, and thus the following values $C_v^{opt}$ and $R_v^{opt}$ can be obtained.

[Math. 14]

$$C_v^{opt} = 2363.68 \text{ pF}, R_v^{opt} = 141.645\Omega \quad (14)$$

Figure 11:
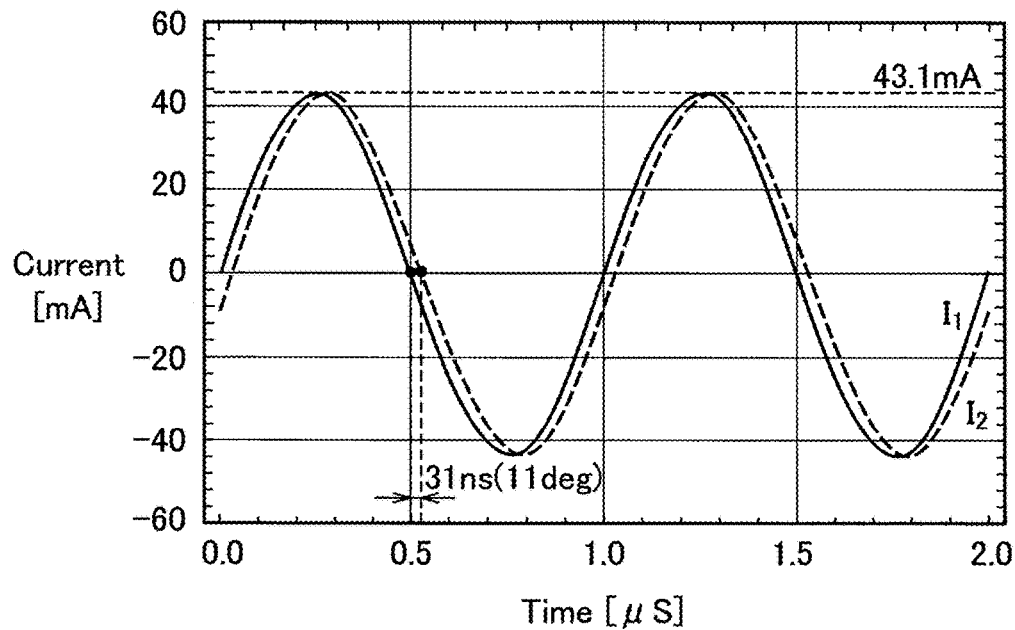
FIG. 11 is a diagram that illustrates current waveforms in a simulation on the equivalent circuit in FIG. 10.

FIG. 11 illustrates waveforms of the currents $I_1$ and $I_2$ in a simulation on the equivalent circuit in FIG. 10 using the parameters of the equations (13) and (14). An amplitude of voltage applied from the signal source 3 is 1V.

According to FIG. 11, it can be seen that the amplitude ratio of the currents $I_1$ and $I_2$ is 1 and a time difference therebetween is 31 ns (comparable to 11 deg). In addition, as an effect of connecting the capacitors $C_1$ and $C_2$ in series with the antennas 1 and 2 respectively, the amplitude of the currents $I_1$ and $I_2$ is greater than that in FIG. 3.

Next, an example where the amplitude ratio $r_0$ is a value other than 1 ($r_0 \neq 1$) in the antenna circuit in FIG. 9 is described.

For example, it is assumed that the currents $I_1$ and $I_2$ satisfying the following equation (15) flow through the antennas 1 and 2.

[Math. 15]

$$r_0 = 1.3, \theta_0 = 11 \text{ deg} \quad (15)$$

Note that, it is assumed that the signal frequency f of the signal source 3 and the inductance $L_2$, the capacitors $C_1$ and $C_2$, and the resistors $R_1$ and $R_2$ of the antenna 2 have the values of the equation (13).

The equations (12) and (13) are substituted into the equations (10) and (11) to calculate appropriate parameters, and thus the following values $C_v^{opt}$ and $R_v^{opt}$ can be obtained.

[Math. 16]

$$C_v^{opt} = 967.844 \text{ pF}, R_v^{opt} = 31.9953\Omega \quad (16)$$

Figure 12:
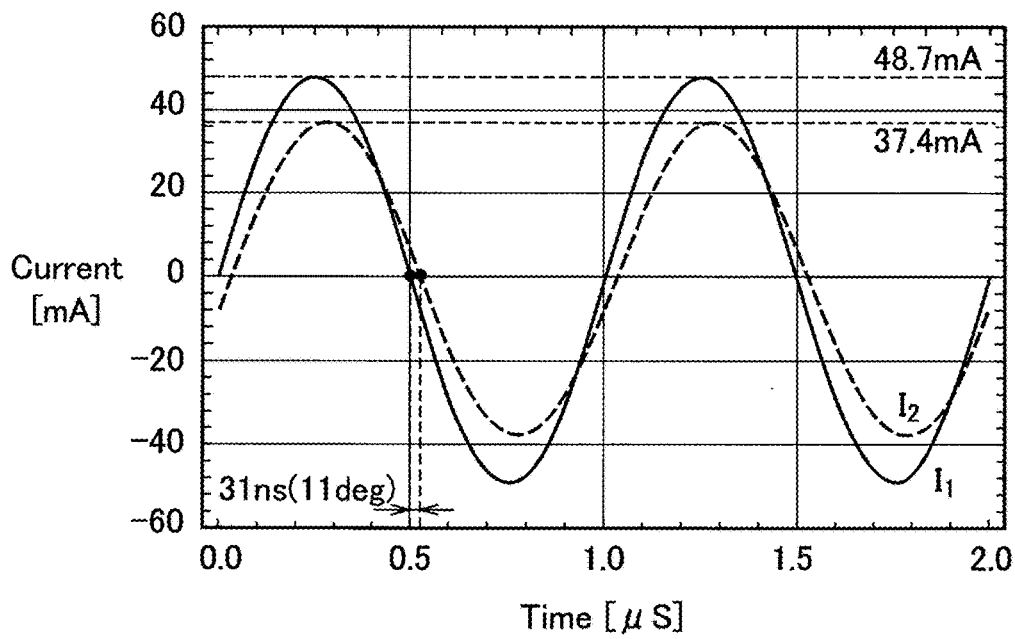
FIG. 12 is a diagram that illustrates other current waveforms in a simulation on the equivalent circuit in FIG. 10.

FIG. 12 illustrates waveforms of the currents $I_1$ and $I_2$ in a simulation on the equivalent circuit in FIG. 10 using the parameters of the equations (13) and (16). An amplitude of voltage applied from the signal source 3 is 1V.

According to FIG. 12, it can be seen that the amplitude ratio of the currents $I_1$ and $I_2$ is 1.3 and a time difference therebetween is 31 ns (comparable to 11 deg). In addition, as an effect of connecting the capacitors $C_1$ and $C_2$ in series with the antennas 1 and 2 respectively, the amplitude of the currents $I_1$ and $I_2$ is greater than that in FIG. 7.

As described above, in the antenna circuit in FIG. 9, employment of the values $C_v^{opt}$ and $R_v^{opt}$ calculated from the equations (10) and (11) enables controlling of the amplitude ratio and phase difference between the currents $I_1$ and $I_2$ flowing through the antennas 1 and 2 as desired and also allows large currents to flow through the antennas 1 and 2.

As described above, according to this embodiment, in the antenna circuit including the antenna 1 and the antenna 2 that is connected in series with the antenna 1 and has inductance, the variable capacitor $C_v$ and the variable resistor $R_v$ connected in parallel with the antenna 2 are provided, and this enables controlling of the actual amplitude ratio r and the phase difference $\theta$ between the currents $I_1$ and $I_2$ flowing through the two antennas 1 and 2 into desired values. Flows of the currents $I_1$ and $I_2$ with the phase difference $\theta$ through the antennas 1 and 2 enables forming of a favorable communication area. In addition, setting of the actual amplitude ratio r between the currents $I_1$ and $I_2$ flowing through the antennas 1 and 2 to a value other than 1 enables forming of an asymmetric communication area.

REFERENCE SIGNS LIST

1, 2 antenna
3 signal source
$C_v$ variable capacitor
$R_v$ variable resistor
$C_1$, $C_2$ capacitor
$R_1$, $R_2$ resistor

The invention claimed is:

1. An antenna circuit, comprising:
a first antenna;
a second antenna that is connected in series with the first antenna and includes inductance;
an adjustment capacitor that is connected in parallel with the second antenna; and
an adjustment resistor that is connected in parallel with the second antenna, wherein desired amplitude ratio $r_0$ and phase difference $\theta_0$ are obtained under conditions where a capacitance value of the adjustment capacitor is expressed by:

$$\frac{1 - r_0 \cos\theta_0}{\omega^2 L_2}$$

and
a resistance value of the adjustment resistor is expressed by:

$$\frac{\omega L_2}{r_0 \sin\theta_0}$$

where $r_0$ is an amplitude ratio between currents flowing through the first antenna and the second antenna, $\theta_0$ is a phase difference between the currents flowing through the first antenna and the second antenna, $\omega$ is an angular frequency of the currents flowing through the first antenna and the second antenna, and $L_2$ is the inductance of the second antenna.

2. The antenna circuit according to claim 1, wherein the amplitude ratio $r_0$ is 1.

3. The antenna circuit according to claim 1, wherein the first antenna and the second antenna are in a same shape.

4. An antenna circuit comprising:
a first antenna;
a second antenna that is connected in series with the first antenna and includes inductance;
a capacitor connected in series with the second antenna;
a resistor connected in series with the second antenna;
an adjustment capacitor connected in parallel with a circuit including the second antenna, the capacitor, and the resistor, and
an adjustment resistor connected in parallel with the circuit including the second antenna, the capacitor, and the resistor.

5. The antenna circuit according to claim 4, wherein desired amplitude ratio $r_0$ and phase difference $\theta_0$ are obtained under conditions where a capacitance value of the adjustment capacitor is expressed by $$C_2 \cdot \frac{\omega C_2 R_2 r_0 \sin\theta_0 + (\omega^2 L_2 C_2 - 1)(1 - r_0 \cos\theta_0)}{1 + (\omega C_2 R_2)^2 + \omega^2 L_2 C_2 (\omega^2 L_2 C_2 - 2)}$$

and
a resistance value of the adjustment resistor is expressed by $$\frac{1}{\omega C_2} \cdot \frac{1 + (\omega C_2 R_2)^2 + \omega^2 L_2 C_2 (\omega^2 L_2 C_2 - 2)}{\omega C_2 R_2 (r_0 \cos\theta_0 - 1) + r_0 \sin\theta_0 (\omega^2 L_2 C_2 - 1)}$$

to obtain desired amplitude ratio $r_0$ and phase difference $\theta_0$
where $r_0$ is an amplitude ratio between currents flowing through the first antenna and the second antenna, $\theta_0$ is a phase difference between the currents flowing through the first antenna and the second antenna, $\omega$ is an angular frequency of the currents flowing through the first antenna and the second antenna, $L_2$ is the inductance of the second antenna, $C_2$ is the capacitance value of the adjustment capacitor, and $R_2$ is the resistance value of the adjustment resistor.

6. The antenna circuit according to claim 5, wherein the amplitude ratio $r_0$ is 1.

7. The antenna circuit according to claim 4, wherein the first antenna and the second antenna are in a same shape.

* * * * *